United States Patent [19]

Brook

[11] Patent Number: 5,218,029
[45] Date of Patent: Jun. 8, 1993

[54] FREE FLOWING MODIFIED POLYPROPYLENE POWDER FOR PRIME COMPOSITIONS WITH FILM-FORMING RESIN SOLVENT

[75] Inventor: Richard L. Brook, Harvard, Ill.

[73] Assignee: Morton Thiokol, Chicago, Ill.

[21] Appl. No.: 765,648

[22] Filed: Sep. 25, 1991

Related U.S. Application Data

[60] Division of Ser. No. 471,914, Jan. 29, 1990, Pat. No. 5,073,594, which is a continuation of Ser. No. 53,439, May 22, 1987, abandoned, which is a continuation of Ser. No. 894,081, Aug. 6, 1986, abandoned, which is a continuation of Ser. No. 681,153, Dec. 13, 1984, abandoned.

[51] Int. Cl.⁵ .................. C08K 5/07; C08F 255/2; C08L 23/26; C08L 63/02
[52] U.S. Cl. .................. 524/365; 523/439; 523/454; 524/360; 525/65; 525/285
[58] Field of Search ............ 525/65, 285; 524/360, 524/365; 523/439, 454

[56] References Cited

U.S. PATENT DOCUMENTS

| | | | |
|---|---|---|---|
| 2,977,334 | 3/1961 | Zopf et al. | 260/27 |
| 3,375,300 | 3/1968 | Ropp | 260/857 |
| 3,419,515 | 12/1968 | Schmidle et al. | 260/33.6 |
| 3,480,580 | 11/1969 | Joyner et al. | 260/29.6 |
| 3,553,153 | 1/1971 | Hazel et al. | 260/29.6 |
| 3,616,047 | 10/1971 | Kehe | 156/334 |
| 3,637,579 | 1/1972 | Barie et al. | 260/41 A |
| 3,749,637 | 7/1973 | Reardon et al. | 161/184 |
| 3,876,609 | 4/1975 | Schrage et al. | 260/42.18 |
| 3,971,749 | 7/1976 | Blunt | 260/33.4 PQ |
| 4,012,270 | 3/1977 | Fitko | 156/306 |
| 4,034,132 | 7/1977 | Mandel | 428/36 |
| 4,100,236 | 7/1978 | Gordon et al. | 264/8 |
| 4,232,086 | 11/1980 | Mori et al. | 428/341 |
| 4,246,368 | 1/1981 | Murase | 525/117 |
| 4,299,754 | 11/1981 | Shiomi et al. | 260/33.6 UA |
| 4,312,902 | 1/1982 | Murase et al. | 427/386 |
| 4,345,004 | 8/1982 | Miyata et al. | 428/416 |
| 4,389,438 | 6/1983 | Ohtsuki et al. | 428/35 |

*Primary Examiner*—Robert E. Sellers
*Attorney, Agent, or Firm*—Gerald K. White

[57] ABSTRACT

A free flowing powder of discrete particles of a polar group-containing modified propylene polymer (MPP) is disclosed. This MPP powder has an average particle size of less than about 5 microns and comprises about 25–45 wt. % of discrete particles of the MPP and about 55–75 wt. % of a liquid which is a solvent for a film forming resin material, all wt. percentages being based on the total weight of the powder. The preferred MPP is maleic anhydride polypropylene. The preferred film forming resin solvent is methyl ethyl ketone (MEK). The MPP powder is adapted to be suspended in a primer composition containing a film forming resin, preferably an epoxy resin.

4 Claims, No Drawings

FREE FLOWING MODIFIED POLYPROPYLENE POWDER FOR PRIME COMPOSITIONS WITH FILM-FORMING RESIN SOLVENT

This application is a divisional of application Ser. No. 07/471,914 filed Jan. 29, 1990, now U.S. Pat. No. 5,073,594, which is in turn a continuation of abandoned application Ser. No. 07/053,439 filed May 22, 1987, which is in turn a continuation of abandoned application Ser. No. 06/894,081 filed Aug. 6, 1986, which in turn is a continuation of abandoned application Ser. No. 06/681,153 filed Dec. 13, 1984.

BACKGROUND OF THE INVENTION

This invention relates to primer compositions which are homogeneous, fluid, uncured suspensions of discrete particles of a modified propylene polymer in a film forming resin and methods for making and using these primers.

Primer compositions are frequently used to bond a polypropylene layer to a variety of substrates, including various metals. These primers often contain particles of a modified propylene polymer in an organic liquid, such as kerosene or Isopar, and sometimes also include a film forming resin such as an epoxy resin. However, these primer compositions suffer from several drawbacks. For instance, those which do not contain the film forming resin may not form a uniform coating on the surface to be bonded, resulting in poor bonding. On the other hand, when the film forming resin is employed, it is often incompatible with the organic solvent which contains the modified propylene polymer making it difficult, if not impossible, to blend enough of the modified propylene polymer particles into the film forming resin to make a useful primer composition.

It has now been unexpectedly found that a primer composition consisting essentially of a homogeneous, fluid, uncured suspension of discrete particles of a polar group-containing modified propylene polymer in a film forming resin material, the particles having an average particle size of less than 5 microns, and the primer composition being substantially free of solvent for the polar group-containing modified propylene polymer eliminates the drawbacks encountered with currently used primers and provides superior bonding properties.

SUMMARY OF THE INVENTION

In accordance with the present invention there is provided a primer composition consisting essentially of a homogeneous, fluid, uncured suspension of discrete particles of a polar group-containing modified propylene polymer in a film forming resin material, the particles having an average particle size of less than 5 microns, and the primer composition being substantially free of solvent for the polar group-containing modified propylene polymer.

There is also provided in accordance with this invention an apparently dry powder comprising about 25% to about 45% of discrete, free flowing, non-agglomerating particles of a polar group-containing modified propylene polymer and about 55% to about 75% of a solvent for a film forming resin material, all percentages being by weight based on the total weight of the powder.

There is further provided in accordance with this invention a process for preparing an apparently dry powder comprising about 25% to about 45% of particles of a polar group-containing modified propylene polymer and about 55% to about 75% of a solvent for a film forming resin material, wherein all percentages are by weight based on the total weight of the powder, said process comprising dissolving a polar group-containing modified propylene polymer at an elevated temperature in a solvent for the polar group-containing modified propylene polymer, cooling the solution to precipitate particles of the polar group-containing modified propylene polymer, collecting the precipitated particles by simultaneously centrifuging and spraying the particles with a liquid which is capable of removing the solvent from the particles and which is also a solvent for a film forming resin material, continuing said centrifuging and spraying until substantially all of the solvent for the polar group-containing modified propylene polymer has been removed from the particles, and collecting the resulting powder.

The present invention further provides a process for laminating a polypropylene layer to a substrate, said process comprising applying to the substrate a primer layer consisting essentially of a homogeneous, fluid, uncured suspension of discrete particles of a polar group-containing modified propylene polymer in a film forming resin material, the particles having an average particle size of less than 5 microns, and the primer being substantially free of solvent for the polar group-containing modified propylene polymer, curing the primer layer, contacting the thus-primed substrate with the polypropylene layer, and bonding the thus-formed laminate by applying heat, pressure or both to the laminate until bonding occurs. The present invention also provides laminates produced by this process.

This invention further provides a process for bonding two articles comprising:

a. Applying to the surface of each article a layer of a primer composition consisting essentially of a homogeneous, fluid, uncured suspension of discrete particles of a polar group-containing modified propylene polymer in a film forming resin material, the particles having an average particle size of less than 5 microns and being present in an amount of at least about 3% by weight based on the nonvolatile content of the primer composition, said primer composition being substantially free of solvent for the polar group-containing modified propylene polymer;

b. curing the thus-formed primer layers; and c. bonding articles by contacting the two cured primer layers and applying heat, pressure or both until bonding occurs. The present invention also provides bonded articles produced by this process.

DETAILED DESCRIPTION OF THE PREFERRED EMBODIMENTS

In accordance with one aspect of this invention, there is provided a primer composition consisting essentially of a homogeneous, fluid, uncured suspension of discrete particles of a polar group-containing modified propylene polymer in a film forming resin material, the particles having an average particle size of less than 5 microns and the primer composition being substantially free of solvent for the polar group-containing modified propylene polymer.

Polar group-containing modified propylene polymers suitable for use in the present invention are polymers obtained by introducing a polar group into a propylene polymer by some suitable means. The "polar groups" which are incorporated in the modified propylene polymer include, for example, atoms or atomic grouping which have good affinity for an epoxy resin or other film forming resin material. The preferred polar group is maleic anhydride.

The amount of the polar groups in the modified propylene polymer must be sufficient to provide adhesion between the polar group-containing modified propylene polymer and the film forming resin material in the primer composition when the primer composition is cured. There is no critical upper limit to the amount of polar groups on the propylene polymer although if this amount becomes too high the mechanical properties of the modified propylene polymer will degrade to the point where the polymer no longer behaves like a propylene polymer. An especially suitable polar group useful in the practice of this invention is a maleic anhydride group.

The preferred polar group-containing modified propylene polymers, i.e. maleic anhydride modified propylene polymers, are commercially available, for example, from Hercules Inc under the trademark Hercoprime.

The polar group-containing modified propylene polymers are employed in the primer compositions of this invention in the form of discrete, essentially spherical particles having an average particle size of less than 5 microns. In another aspect of this invention, there is provided a particularly preferred method of preparing these particles. In accordance with that aspect of this invention, the polar group-containing modified propylene polymer is dissolved at an elevated temperature in a normally liquid organic material which is a solvent for the modified propylene polymer. The term "solvent" as used in this context refers to normally liquid organic materials which are capable of dissolving the modified propylene polymer. Generally, such dissolution can be accomplished only at elevated temperatures. However, the term "solvent" as used herein refers to these liquid organic materials both when they are employed under circumstances which cause dissolution of the polymer, e.g., elevated temperature, or under circumstances which do not cause the polymer to dissolve, e.g., room temperature. Examples of solvents for the polar group-containing modified propylene polymer include, but are not limited to, paraffin hydrocarbons, aromatic hydrocarbons and halogenated hydrocarbons. Preferred solvents include n-decane, hexadecane, chlorobenzene, cyclohexane, xylene (mixed), n-heptane, Isopar H and Isopar M (mixtures of isoparaffinic hydrocarbons), and Solvesso 150 (a mixture of aromatic hydrocarbons). Normally, the modified propylene polymer will be dissolved in the solvent at the temperature which is just high enough to cause the modified propylene polymer to dissolve. This temperature can vary depending upon the particular solvent employed, about 120° C. being the requisite temperature for the preferred solvent, Isopar M. As noted below, excessive heating of the solvent during dissolution can result in undesirable particle sizes for the recrystallized modified propylene polymer.

The modified propylene polymer is dissolved in the hot solvent to a concentration of about 1% to about 15%, preferably about 5% to about 10%. Concentrations higher than about 15% will not produce particles within the desired particle size range. After the modified propylene polymer is completely dissolved, the resulting solution is cooled quiescently to room temperature which causes the modified propylene polymer to recrystallize in the form of particles.

It is important to note at this point that the size of the particles resulting from the above procedure is dependent upon a number of factors, principally the temperature of the solvent and the concentration of the modified propylene polymer in the solvent. For example, the small particle sizes (5 microns and smaller) of this invention are achieved by heating the solvent only as much as is needed to dissolve the modified propylene polymer. Heating the solvent to higher temperatures tends to cause fewer, larger particles to form. By way of example, if Isopar M is the solvent, heating the solvent to about 120° C. will produce particles in the desired range whereas temperatures in excess of about 137° C. produce particles which are too large.

Another factor which controls particle size is the concentration of the modified propylene polymer in the hot solution. To some degree, the effects of concentration on particle size are independent of the temperature of the solvent. For instance, in the example cited above, if the Isopar M is at the preferred temperature of 120° C., but the concentration is above about 15%, the "particles" which form, upon cooling are so close together (i.e., so many particles are contained in a relatively small volume of solvent) that the particles will agglomerate and "clump" into a semi-solid material rather than remaining as discrete particles. At lower concentrations, however, the small particles which form upon cooling are dispersed sufficiently in a relatively large volume of solvent so agglomeration is kept to a minimum.

The recrystallized particles obtained from the above-described method are then collected and subjected to shear (to separate weakly agglomerated particles) to form a dispersion of the particles in the now cool solvent. This dispersion must be filtered to remove the solvent and collect the particles in the form of an apparently dry, free-flowing powder.

Considerable difficulty was encountered in attempts to remove to low levels the solvent from the particles. Standard filtration techniques proved ineffective for removing the solvent to the low levels required by this invention. Even centrifuging did not sufficiently separate the solvent from the particles. Finally it was discovered that if the particles were centrifuged in a drum and simultaneously sprayed with a liquid capable of removing the solvent from the particles, and this procedure continued or repeated until the desired amount of solvent is separated from the particles, a powder was produced which was substantially free of solvent for the modified propylene polymer. As used herein the term "substantially free of solvent for said polar group-containing modified propylene polymer" means that the composition contains less than about 3% to about 5% solvent for the modified propylene polymer based on the weight of the modified propylene polymer. The liquid capable of removing the solvent from the particles may also be added to the solvent/particle dispersion after recrystallization of the particles, but prior to centrifuging the dispersion. This allows the solvent to be removed from the particles at a much faster rate, perhaps two to three times faster than without such liquid being present.

By preparing the modified propylene polymer according to the above-described process an apparently dry, free flowing powder can be produced which is substantially free of solvent for the modified propylene polymer. However, it was quite unexpectedly found that the resulting powder, though dry in appearance, actually contains a substantial amount of the liquid used to remove or displace the solvent for the modified propylene polymer. By way of illustration, a typical product which contained about 15% by weight of modified propylene polymer and 85% by weight solvent for the polymer prior to centrifuging and spraying yielded a final powdery product which was about 40% by weight modified propylene polymer, only about 3% by weight solvent of the resin, and a quite unexpected 57% by weight of the liquid used to remove the polymer solvent.

While the powder by the above process could be dried to remove the liquid used to remove the polymer solvent, it can be particularly advantageous to allow this liquid to remain part of the powder system. For example, if it is intended that the powder produced by the above process is to be dispersed in a film forming resin material, then the liquid used to remove the polymer solvent can be selected so that it will not only remove the polymer solvent, but will also be a solvent for the film forming resin material. The presence of this liquid in the powder system greatly enhances the ability of the powder to disperse in the film forming resin material when compared to modified propylene polymer powders which do not contain such a liquid. Also, the presence of the liquid in the powder reduces dusting which would otherwise be a potential safety hazard.

Examples of liquids which may be used to remove the polymer solvent include, but are not limited to, methyl ethyl ketone (MEK), cyclohexanone and the like.

As noted above, the powder produced by the process of this invention is substantially free of solvent for the modified propylene polymer. This results in several advantages over modified propylene polymer powders or particles which are dispersed in solvent for the polymer or which contain substantial amounts of such solvent, i.e., more than about 5%. The presence of substantial amounts of such solvents can lead to several problems, such as incompatibility with the film forming resin material or other components employed in a primer composition containing the powder. Also, if a large amount of the solvent for the modified propylene polymer is present in the primer when it is cured at elevated temperature, air pollution problems can result from the release of the solvent. These problems are avoided or overcome by the powders produced by the process of this invention because they are substantially free of such solvents. This advantage is particularly pronounced where it is desirable to introduce large amounts of modified propylene polymer particles into a film forming resin material. Heretofore, it was necessary to introduce large quantities of polymer solvent into the film forming resin material along with the particles. However, large amounts of polymer solvent are often incompatible with the film forming resin material which can cause phase separation of the materials.

The lack of polymer solvent in the powders of this invention also leads to several economic advantages over those systems which require large amounts of the solvent to be present. For instance, the process by which the powders of this invention are made permits the solvent to be recycled rather than merely lost by evaporation upon curing. Also, shipping and handling costs are substantially reduced because large quantities of solvent need not be handled and shipped along with the powder.

In another aspect, this invention provides primer compositions consisting essentially of a homogeneous, fluid, uncured suspension of discrete particles of a polar group-containing modified propylene polymer in a film forming resin material, the particles having an average particle size of less than 5 microns, and the primer composition being substantially free of solvent for the polar group-containing modified propylene polymer.

The particles of polar group-containing modified propylene polymer useful in the primer composition of this invention are prepared from the previously described modified propylene polymer by the process previously described, and have an average particle size of less than 5 microns. It has quite unexpectedly been found that, for a fixed amount of modified propylene polymer in primer compositions, smaller particle size of the modified propylene polymer results in dramatically increased bond strength when the primer composition is used to bond a polypropylene layer to a substrate. It has also been observed that larger particles (i.e. larger than about 5 microns) may not provide a uniform layer when the primer is applied to the surfaces to be bonded and subsequently cured, with a consequent decrease in bonding performance.

It has now been discovered that small particle sizes, i.e., less than about 5 microns, provide primer compositions which form a uniform layer on the surface to be bonded and enhance bond strength. As noted above, these small particle sizes provide primer compositions which, at a fixed amount of modified propylene polymer, have better bonding strength than primers containing larger particles. Another benefit of the smaller particle sizes is that bond strengths equivalent to those achieved with larger particles can be attained with a lower amount of the small particle size modified propylene polymer.

The film forming resin materials useful in the primer compositions of this invention are thermosetting resins, preferably epoxy resins. The epoxy resins useful in this invention are polymeric reaction products of polyfunctional halohydrins with polyhydric alcohols, e.g. polyhydric phenols. A typical epoxy resin useful in the primer compositions of this invention has the structural formula:

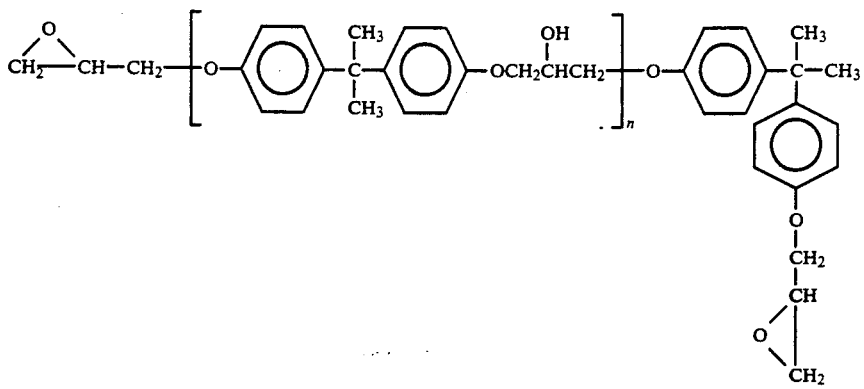

wherein n represents the number of molecules condensed. Typical polyfunctional halohydrins are epichlorohydrin, glycerol dichlorohydrin, and the like. Typical polyhydric phenols are resorcinol and a 2,2-bis(4-hydroxyphenyl)alkane, the latter resulting from the condensation of phenols with aldehydes and ketones, including formaldehyde, acetaldehyde, propionaldehyde, acetone, methyl ethyl ketone and the like, which result in such compounds as 2,2-bis(4-hydroxyphenyl) propane and like compounds.

The epoxy resins useful in this invention generally require a curing agent which causes crosslinking of the resin upon curing. A wide variety of these curing agents are known in the epoxy resin art, generally falling within the categories of polyfunctional primary and secondary amines, dibasic acids or acid anhydrides, carboxylic acid amides, methyolated melamines, blocked isocyanates, dicyandiamide and its derivatives, carboxylic acid dihydrazides, imidazoline, imidazole, and salts of imidazoline or imidazole. Examples of these curing agents include, but are not limited to diethylene triamine, diethylamino propylamine, adipic acid, sebacic acid, phthalic acid, trimellitic acid, maleic anhydride, phthalic anhydride, trimellitic anhydride, itaconic anhydride, tetrahydrophthalic anhydride, pyromellitic anhydride, the addition product of dimeric acid with triethylenetetramine, methyl etherified hexamethylolmelamine, epsilon-caprolactam-blocked isophorone diisocyanate, cresol-blocked tolylene diisocyanate-trimethylolpropane adduct, 2,6-xylenyl biguanide and adipic acid dihydrazide.

The amount of curing agent required can vary widely depending upon the particular epoxy resin and curing agent employed. This amount will, however, depend upon two factors. The first is the degree of cure desired; the second is the desired cure rate.

It is believed that, when the primer compositions of this invention are coated onto a substrate, the modified propylene polymer particles migrate to the surface of the film forming resin where, upon heating, they melt and form a continuous, uniform layer of modified propylene polymer. It is, therefore, essential that the film forming resin not cure before the particles can reach the surface of the resin layer, for to do so would trap the particles in the cured resin and prevent their contact with any material subsequently applied to the coated substrate. Thus, the curing agent and the amount employed must be chosen so that the cure rate is slow enough to permit substantially all of the modified propylene particles to reach the coating layer surface prior to curing of the film forming resin. In this regard, the so-called "latent" curing agents are particularly advantageous since they prevent premature curing of the resin.

The modified propylene polymer particles may be added to the film forming resin material by simply stirring the particles into the film forming resin material using, for example, conventional paint mixing equipment.

Generally, the modified propylene polymer particles are employed in the primer compositions of this invention in an amount which will produce a uniform, continuous layer of modified propylene polymer at the surface of the cured primer layer. While this minimum amount varies with particle size, it will generally be in the range of at least about 3% by weight based on the nonvolatile content of the primer. Amounts greater than 30% provide several advantages, such as the ability to bond two metal surfaces without the use of an intermediate polypropylene layer. One unexpected advantage provided by this invention is that the modified propylene polymer powders of the invention are so readily dispersed in the film forming resin material that very high concentrations of the powder in the film forming resin material can be achieved. Thus, primer compositions containing as much as 50% or more modified propylene polymer powder can be easily made. These large concentrations of modified propylene polymer are particularly desirable when the primer composition is employed to bond two substrates without the use of an intermediate polypropylene layer or when the primer composition is used simply to provide a chemically resistant coating of modified propylene polymer on the surface of a substrate.

There is no critical upper limit for the amount of modified propylene polymer in the primer compositions of this invention, the maximum amount being determined only by that amount of modified propylene polymer which will disperse in the film forming resin and still produce a primer which can be coated onto and bond to a substrate.

The primer compositions are used in accordance with this invention by coating them on a substrate, heating the primer coating at an elevated temperature until the modified propylene polymer particles melt and form a uniform, continuous layer on the surface of the primer, and then curing the film forming resin material. (This entire procedure is referred to herein simply as "curing" the primer composition). The temperature to which the primer is heated may vary somewhat, but must be at least high enough to cause the modified propylene polymer particles to melt. Generally, this temperature will be about 380°–400° C.

The primer compositions of the present invention are primarily useful for bonding a polypropylene surface to a substrate. The substrate may be any material to which the film forming resin will bond and which will withstand the temperature required to cure the primer. Useful substrate materials include, but are not limited to wood, glass, metals and many plastics.

The laminates of the present invention are made by applying a layer of the primer composition of this invention to the surface of a substrate layer, curing the primer composition and contacting the thus-primed substrate layer with the layer to which it is to be bonded (polypropylene or another primed surface) and bonding the two layers by applying heat and pressure to the thus-formed laminate until bonding occurs.

Particularly useful laminates can be made in accordance with this invention by bonding two layers of substrate together by means of an intermediate layer of polypropylene. Such a "sandwich" is made by coating one surface of each substrate layer with a layer of the primer composition of this invention, curing each primer layer, placing the polypropylene layer between the primed substrate layers (with the cured primer layer on each substrate facing the polypropylene layer) and bonding the primed substrates to the polypropylene layer.

An alternative to the substrate-polypropylene-substrate "sandwich" is provided by simply coating one surface of each substrate layer with a layer of the primer composition of this invention, curing the primer (which forms a surface layer of modified propylene polymer on each substrate) and bonding the two substrate layers (with the primed surfaces facing each other) directly to one another. While this alternative does not produce bond strengths as high as when an intermediate layer of polypropylene is used, it does provide sufficient bond strength for some applications, e.g. bonding packaging films or making a peelable bond, and does eliminate the need for the intermediate polypropylene layer.

EXAMPLE 1

A maleic anhydride-modified polypropylene powder (Hercoprime A sold by Hercules, Inc.) is added to Isopar M (an isoparaffinic solvent) which is then heated to about 135°–142° C. The resulting mixture is maintained at this temperature until all of the maleic anhydride-modified polypropylene dissolves. The resulting solution is then poured onto a moving, chilled stainless steel belt and left on the belt until it cools to about 49°–70° C. During this time the maleic anhydride-modified polypropylene recrystallizes in the Isopar M. The resulting product is scraped off the belt in the form of weakly agglomerated particles of maleic anhydride-modified polypropylene dispersed in the Isopar M. This product is then subjected to shear and fluidization and homogenized (Gaulin homogenizer, 3000–4000 p.s.i.) to break apart the agglomerated particles. The solids content of the resulting product is then adjusted to a desired level and the product is homogenized again, resulting in a product which has essentially discrete particles of the modified polypropylene (average particle size less than 5 microns) dispersed in Isopar M which has a viscosity (Brookfield) of about 100–300 centipoise and is about 15% solids.

One drum of the above product is placed into a holding tank and agitated to prevent settling of the particles. About one half of this product is then centrifuged in a Tolhurst centrifuge (36 inch diameter drum) which is lined with a heavy, tightly woven filter bag. After about 40 minutes of centrifuging the filter cake is white and the filtrate is coming out of the machine at a rate of about 156 grams/minute. After about 50 minutes of centrifuging about 75.5 pounds of Isopar M has been collected. The filter cake is then sprayed with about 17 pounds of methyl ethyl ketone (MEK) and centrifuged until the rate of filtrate removal slows to a trickle. The filter cake is then sprayed again with MEK (about 16 pounds) and spun until the rate of filtrate removal slows to a trickle. The resulting filter cake is about 60mm thick with a dry band of about 45 mm on the inside of the cake and a darker, moist band of about 15 mm on the outer portion of the filter cake.

EXAMPLE 2

The remainder of the drum of Isopar M/modified polypropylene product used in Example 1 is centrifuged by first adding 100 pounds of MEK to this product and mixing until uniform. The resulting mixture is then placed in the centrifuge and spun at about 700rpms. The resulting filter cake is sprayed twice with MEK in the same manner as the first run. Upon completion of the centrifuging the filter cake is examined and found to have a dark outer band of material about 1 cm thick with the remainder of the material being dry and snow white. The dry portion of the filter cake is tested for solid content and found to contain about 41.5% solids and, though apparently dry, about 58.5% solvent. GC analysis indicates that the "dry" filter cake is about 53.1% MEK, about 4.7% Isopar M and about 42.2% modified polypropylene.

EXAMPLE 3

A primer composition is prepared from the "dry", snow white product of Example 2 which is 53.1% MEK, 4.7% Isopar M and 42.2% modified polypropylene. The primer composition contains:
22.5 grams snow white filter cake
84.0 grams of a solution of aminoplast cured bisphenol A epoxy resin (R-287 epoxy resin sold by Inmont Corp.)
36.7 grams MEK The resulting primer composition contains 33% solids The primer composition is applied to two clean 1 inch wide aluminum (25 mil) strips and baked in an oven at about 400° F for about 2 minutes to cure the primer. A laminate is then formed by applying one aluminum strip to each side of a 50 mil thick strip of EPDM-modified polypropylene with the primed surface of the aluminum facing the polypropylene "core". The resulting laminate is then pressed together at about 390° F. at a pressure of about 5–10 p.s.i for about 1 minute. The peel strength of the resulting bonded laminate is very high with failure occurring about 10 mils into the 50 mil polypropylene core. Peel strength values range between about 105–123 lbs/lineal inch. Failure is 100% cohesive.

EXAMPLE 4

A primer composition is prepared by placing the following ingredients in a suitable container:
1162.8 gms of a solution (43% solids) of aminoplast cured bisphenol A epoxy resin (R-287 epoxy resin sold by Inmont Corp.)

1184.8 gms modified, polypropylene filtercake prepared as in Example 2 (42.2% solids)
682.4 gms MEK An additional 90 gms MEK is added to the container and the resulting mixture is sheared until homogeneous. The mixture is then passed once through a Gaulin homogenizer.

The resulting primer composition is applied with a no. 13 wire wound rod to one surface of each of two pieces of clean 4 mil aluminum foil. Both pieces of coated foil are then baked at about 405° F. for about 2 minutes. One piece of foil is then placed on top of the other with the coated surfaces facing each other and the two foil pieces are bonded by pressing together at a pressure of about 40 psi and a temperature of about 425° F. for about 2.5 seconds. The resulting laminate has a peel strength of about 2800–3000gm/inch.

The primer composition is also applied to 13 mil aluminum foil with a no. 21 wire wound rod. The thus-coated foil is then baked for about 2 minutes at about 405° F. Strips one inch wide and three inches long are cut from the foil and heat sealed (primed surfaces facing each other) at about 420° F., 40 psi for about 2.5 seconds. The resulting laminates are tested in an Instron Model 1123 at one inch/minute jaw separation and 20 pound full scale load. The results are as follows:

| Overlap Width of Bonded Area | Peel Strength |
| --- | --- |
| 13/16 inch | 13.5 lbs/in. |
| 14/16 inch | 15.3 lbs/in. |

I claim:

1. A free flowing powder comprising about 25% to about 45% by weight of discrete particles of a polar group-containing modified propylene polymer and about 55% to about 75% by weight of a solvent for a film forming resin material, wherein said particles have an average particle size of less than about 5 microns, all weight percentages being based on the total weight of the powder.

2. A powder according to claim 1 wherein the polar group-containing modified propylene polymer is maleic anhydride modified polypropylene.

3. A powder according to claim 1 wherein the solvent for a film forming resin material is a solvent for an epoxy resin.

4. A powder according to claim 3 wherein the solvent for an epoxy resin is methyl ethyl ketone.

* * * * *